United States Patent [19]
Murakami et al.

[11] Patent Number: 5,367,335
[45] Date of Patent: Nov. 22, 1994

[54] IMAGE CODING SYSTEM AND METHOD INCLUDING A POWER CALCULATOR

[75] Inventors: Tokumichi Murakami; Toshiaki Shimada, both of Kamakura, Japan

[73] Assignee: Mitsubishi Denki Kabushiki Kaisha, Tokyo, Japan

[21] Appl. No.: 118,939

[22] Filed: Sep. 9, 1993

Related U.S. Application Data

[62] Division of Ser. No. 884,635, May 15, 1992, abandoned.

[30] Foreign Application Priority Data

| May 24, 1991 | [JP] | Japan | 3-120162 |
| May 24, 1991 | [JP] | Japan | 3-120163 |
| Aug. 20, 1991 | [JP] | Japan | 3-208025 |

[51] Int. Cl.$^5$ .................................... H04N 7/133
[52] U.S. Cl. ............................ 348/405; 341/51; 341/200; 348/419
[58] Field of Search ............ 348/405, 419; 341/51, 341/200; 375/26; H04N 7/133

[56] References Cited

U.S. PATENT DOCUMENTS

| 4,862,173 | 8/1989 | Nishitani .......................... 348/419 |
| 4,958,226 | 9/1990 | Haskell et al. . | |
| 5,038,209 | 8/1991 | Hang ................................ 348/405 |
| 5,134,477 | 7/1992 | Knauer et al. . | |
| 5,214,773 | 5/1993 | Endo . | |
| 5,218,555 | 6/1993 | Komai . | |

FOREIGN PATENT DOCUMENTS

| 0424060 | 10/1990 | European Pat. Off. . |
| 0478230 | 9/1991 | European Pat. Off. . |
| 0395440 | 4/1990 | Japan . |
| 3-295392 | 12/1991 | Japan . |

OTHER PUBLICATIONS

MPEG: A Video Compression Standard for Multimedia Applications Apr. 1991 pp. 47–58.
Kong & Kosko "Adaptive Fuzzy System for Transform Image Coding" IEEE 1991 pp. Ii–609–I–613.
*"A New Model of Fuzzy Reasoning", Zhigiang Cao, Abraham Kandel, and Lihong Li, SUS Center for Artificial Intelligence and the Department of Computer Science, Feb., 1989.

*Primary Examiner*—Howard W. Britton
*Attorney, Agent, or Firm*—Wolf, Greenfield & Sacks

[57] ABSTRACT

An image coding system determines an amount a data that is output by a coder of the system and also determines a target code produced amount based on the motion of an input image. The coder of the coding system encodes the input image. A record of a data amount of past coded data is used as the inference of the target code amount. Hence, proper coding can be performed in a sending side. Further, by converting the data amount into a value with a condition to be standard, accuracy of the inference may be improved. In addition, an indication of the power amount of the data to be coded is used as a factor for determining a target code produced amount to expedite a combination of a plurality of coding modes.

11 Claims, 16 Drawing Sheets

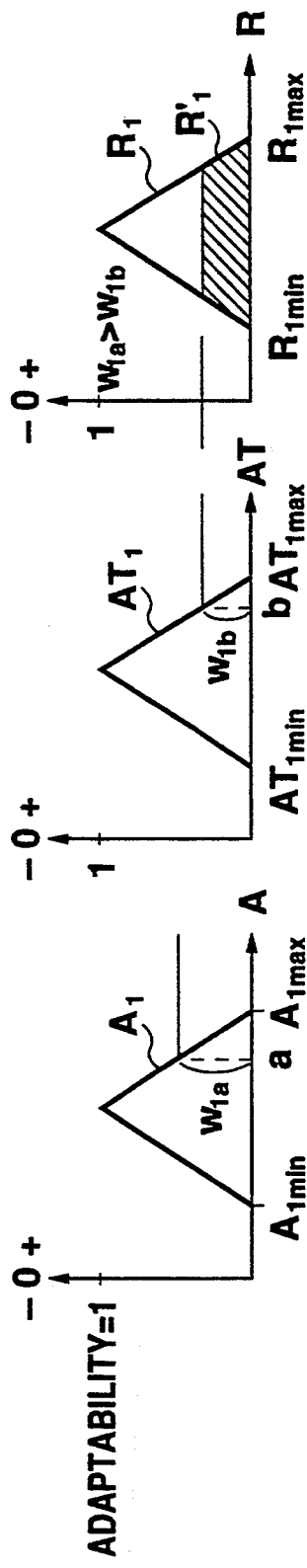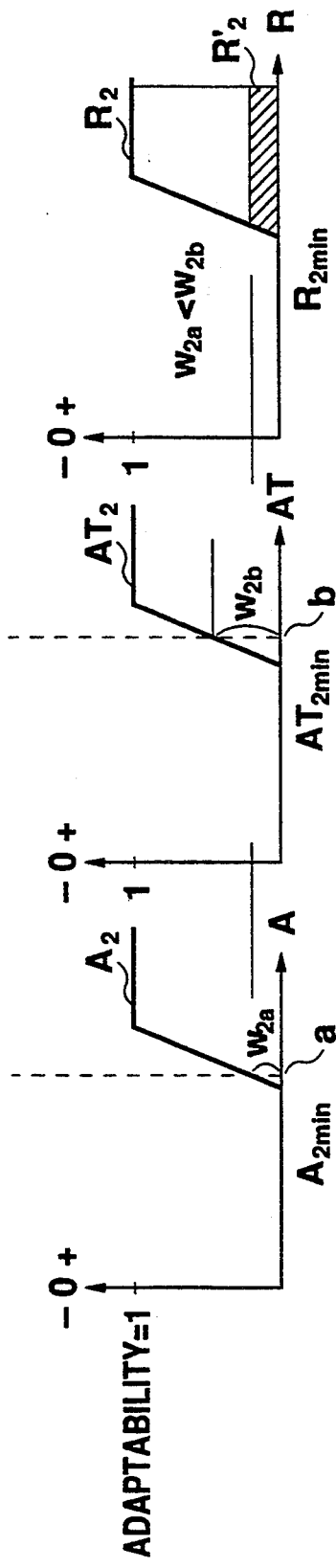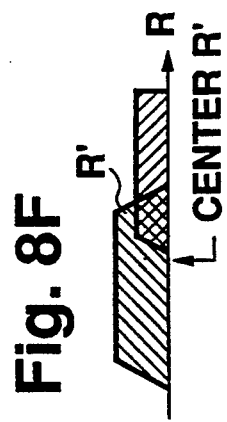

IMAGE CODING SYSTEM AND METHOD INCLUDING A POWER CALCULATOR

This, application is a division of application Ser. No. 07/884,635, filed May 15, 1992, now abandoned.

BACKGROUND OF THE INVENTION i) Field of the Invention

The present invention relates generally to an image coding system and, more particularly, to an image coding system for carrying out a coding process based on motion in a temporally changing image.

ii) Description of the Prior Art

Pixel illuminance data of images is typically transmitted as a sequence of digitally encoded frames. Each frame contains sufficient pixel data for complete coverage of a video display. In the simplest case, a frame contains pixel data for all of the pixels in a display. For television applications, frames are transmitted at a rate of thirty frames per second. Given the large number of pixels in a typical display and given the rate at which the frames are transmitted (i.e., the frame rate), video transmission generally requires the transmittal of large amounts of data. Hence, image data is typically coded to compress the data so that the data may be more efficiently transmitted. The amount of compression realized when coding is performed varies in accordance with a number of factors, including the coding method employed, the amount of movement in the image, the spatial resolution, and the temporal resolution.

The amount of data sent per frame affects the quality of the reproduced image. For example, as shown in FIG. 1, when the amount of data included per frame is increased (see the portion of the curve 2 where the frame rate, expressed as $I/B_m$, where $B_m$ is a target information amount, is low), spatial resolution increases and, thus, the image quality (i.e., the signal to noise ratio (S/N)) of each frame is raised. However, the number of frames that can be transmitted per unit time is reduced (i.e., the frame rate decreases) so that temporal resolution drops. On the other hand, when the amount of data per frame decreases, the image quality also decreases, but the motion follow-up performance increases as shown by the curve 2 in FIG. 1.

Another approach to reducing the amount of data in a transmitted frame is to use a filter that removes a percentage of the image data. For example, suppose that the data is the illuminance difference between corresponding pixels in a present frame and a preceding frame. The amount of data that is transmitted may be reduced by increasing a threshold value, which the illuminance differences must exceed to be transmitted (curve 6 in FIG. 2 shows an example wherein the filter threshold is raised from $T_1$ to $T_2$). As a result, the transmitted information amount decreases from $B_1$ to $B_2$. The thresholds are switched to raise the efficiency of the image transmission based on the image to be transmitted.

The switching of thresholds to regulate information amount may be performed by an image transmission controller such as disclosed in Japanese Patent Laid-open No. HEI 3-295392. The system of that patent includes a receiving side where the image is reproduced from the transmitted data. This receiving side operates by determining a productive data amount for a frame. This data amount is then sent to the sending side, wherein coding processing is carried out according to the data amount specified by the receiving side. FIG. 2 shows an example of the threshold values that must be selected to realize this data amount $B_m$ for different images. In particular, for the image represented by curve 8, threshold $T_1$ must be chosen in order to realize the specified data amount $B_M$. In contrast, for the image of curve 4, a higher threshold, $T_2$, must be chosen to realize the data amount $B_M$.

In this system, the data for switching thresholds must be sent from the receiving side to the sending side. Hence, in a system lacking a data transmission means, switching of thresholds cannot be carried out. Further, in the case where the data amount is changed by only changing the threshold value, as described above, a delicate image quality and motion follow-up performance is difficult to achieve, and, thus, the efficiency of the image data transmission is poor.

SUMMARY OF THE INVENTION

The present invention provides a coding control apparatus that is able to overcome the above-described difficulties of the prior art. In accordance with the present invention, an image system has a coder for coding a sequence of image signals as dictated by a control signal that sets coding parameters for the coder. The image coding system also includes a controller for controlling the coder. The controller includes a motion detector for detecting an extent of motion between an image signal and at least one previously encoded image signal based on an information amount of the current image signal and an average information amount of at least one previously encoded image signal. The extent of motion detected by the motion detector is passed on to a coding update means. The coding update means generates a control signal that sets the coding parameters based on current coding parameters and extent of motion detected by the motion detector. The coding update means may be realized as an inference means for inferring the control signal using a control rule based on the extent of motion detected by the motion detector and current coding parameters. Likewise, the coding update means may alternatively be realized as a coding parameter set means that generates a control signal so that the coding produces a target information amount.

In accordance with one embodiment, the coding control apparatus codes a frame of an image data according to the motion between image data of frame and image data of at least one previous frame. In this embodiment, the coding control apparatus includes a first memory for storing motion characteristics of the image data of the previous frames. The coding control apparatus further includes a second memory for storing a coding parameter to control coding of the image data of the present frame so that coded image data has a produced information amount. A detector detects motion over a predetermined sequence of frames from the past motion characteristics held in the first memory. The coding parameters are updated via an inference means, such as that described above.

In another alternative embodiment, the image coding apparatus includes a converter for converting the produced information amount of the coded data into a conversion coded data amount, while maintaining a fixed relationship between a predetermined quantized condition and the produced information amount. In this alternative embodiment, a quantized update means calculates the quantize condition and updates the quantize condition in the coding means according to the motion characteristics obtained by the detector.

In a third embodiment, the apparatus includes an image processor for receiving input image data and processing the input image data so that it is compatible with the coder. The coder codes the input image data under a predetermined quantize condition and a plurality of different coding modes. Each mode codes the data in a different fashion. In this third embodiment, the apparatus includes a power calculator for calculating estimated output power as a sum of a size of the data that is output by the image processor. This third embodiment further includes a coded parameter set means like that described above.

BRIEF DESCRIPTION OF THE DRAWINGS

These and other objects, features and advantages of the present invention will more fully appear from the following description of the preferred embodiments with reference to the accompanying drawings, in which:

FIGS. 8A-8G are schematic views explaining a coding control operation by fuzzy inference in a fuzzy inference unit according to the first embodiment of the present invention;

FIGS. 10A-10H are schematic views showing one example of a control rule used for the fuzzy inference in the fuzzy inference unit according to the first embodiment of the present invention;

DETAILED DESCRIPTION OF THE PREFERRED EMBODIMENTS

Figure 1:
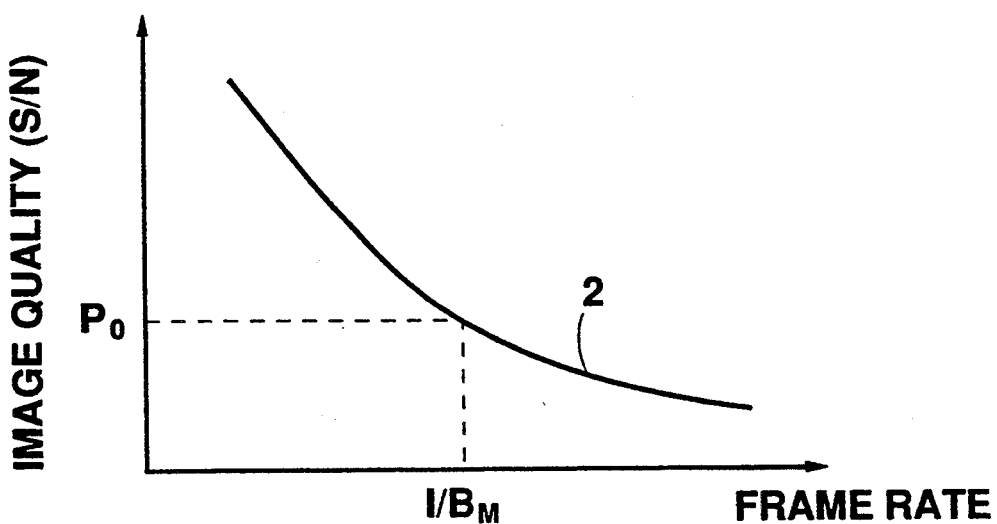
FIG. 1 is a graph showing the relationship between frame rate and image quality in a conventional coding controller.
Figure 2:
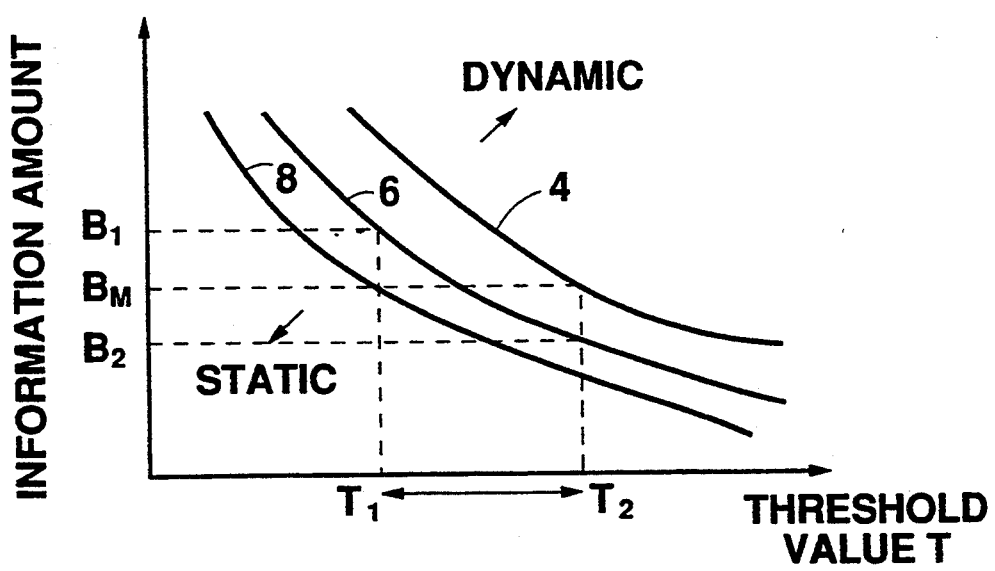
FIG. 2 is a graph showing the relationship between threshold value and a produced information amount in a conventional coding controller.

The present invention will now be described in connection with its preferred embodiments with reference to the attached drawings, wherein like reference characters designate like or corresponding parts throughout different views, and, thus, the repeated description thereof is omitted for brevity.

Figure 3:
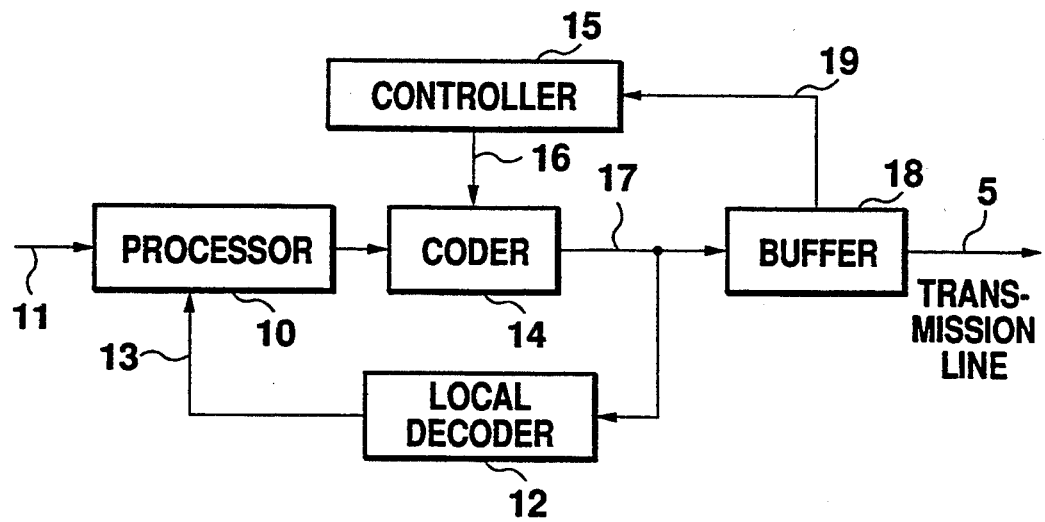
FIG. 3 is a block diagram of a coding processor in a sending side according to a first embodiment of the present invention.

FIG. 3 shows a coding processor in a sending side of a system for transmitting image data, in accordance with the first embodiment of the present invention. In this embodiment, an image processor 10 receives input image data 11 and decoded data 13 of previously received input image data that is sent from a sending side local decoder 12. The local decoder 12 locally decodes the coded data 17 of previously received input image data that is output by a coder 14. The image processor 10 processes the input image data 11 and decoded data 13 to output either a value that is indicative of the difference between the input and previous data or input image data 11.

The data output from the image processor 10 is coded by the coder 14 in accordance with the coding parameters 16 that are sent from the coding controller 15. The coding parameters 16 will be described in more detail below.

Figure 5:
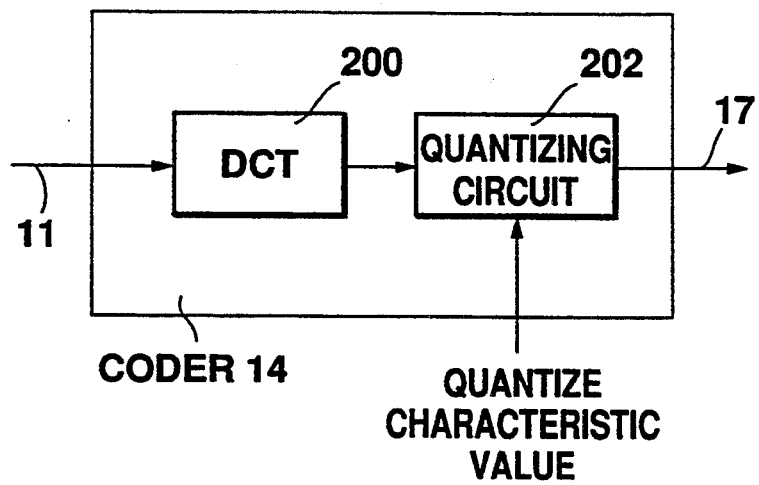
FIG. 5 is a more detailed block diagram of the coder 14 of FIG. 3.

FIG. 5 provides a more detailed depiction of the coder 14. The coder includes a transform circuit 200 for performing a transformation such as a discrete cosine transfer (DCT) on the input image data 11. The transformed data is passed to a quantizing circuit 202 where the data is quantized to produce coded data. Quantization is controlled by a quantize characteristic value that is passed to the coder 14 as part of the coding parameters 16. The quantize characteristic value controls the amount of information that is coded by controlling the quantization of the data.

Figure 6:
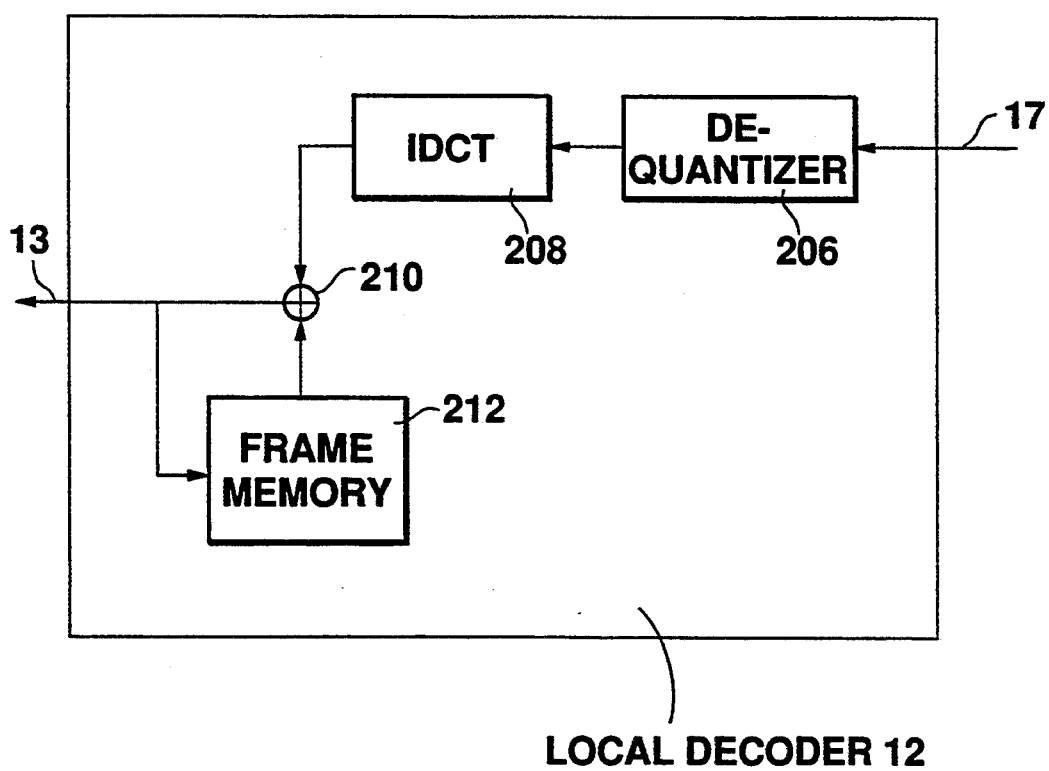
FIG. 6 is a more detailed block diagram of the local decoder 12 of FIG. 3.

The coder 14 outputs the coded data 17 to the local decoder 12. FIG. 6 provides a more detailed view of the local decoder 12. The local decoder receives the coded data 17 and forwards the data to a requantizer 206, wherein the data is requantized. The requantized data is then passed to an inverse discrete cosine transform (IDCT) circuit 208 that performs an inverse discrete cosine transform on the requantized data. The transformed data is then added with data from the previous frame by adder 210 to produce the decoded image data. The image data of the previous frame is retrieved from a frame memory 212.

The coded data is also sent to the transmission buffer 18 which temporarily stores the coded data 17. The transmission buffer 18 determines and outputs the produced information amount 19 to the coding controller 15. The coded data is then transmitted down a transmission line 5.

The above-described system operates as follows. For illustrative purposes, suppose that the input image data is processed in pixel block units (hereinafter referred to in short as blocks) that are composed of a plurality of pixels (such as 8 pixels × 8 pixels). When the image processor 10 is operating in an intra-frame estimation mode, the image processor 10 receives the input image data 11 and outputs a block of the input image data to the coder 14. In contrast, when the image processor 10 is operating in an inter-frame estimation mode, the image processor outputs a difference value between the block of the input image 11 and the block of the estimated image 13 (i.e., the corresponding block of the proceeding frame). The image block data that is output from the image processor 10 is then coded by the coder 14. The coder 14 encodes the image block data so as to produce a coded output having the target produced information amount specified by the coding parameters 16. The coded data 17 is output from the coder 14 to the transmission line 5 via the transmission buffer 18. The coded data 17 is also output to the local decoder 12. In the transmission buffer 18, the information amount 19 in the unit that was processed (such as a block unit, frame unit or the like) is output to the coding controller 15.

Figure 4:
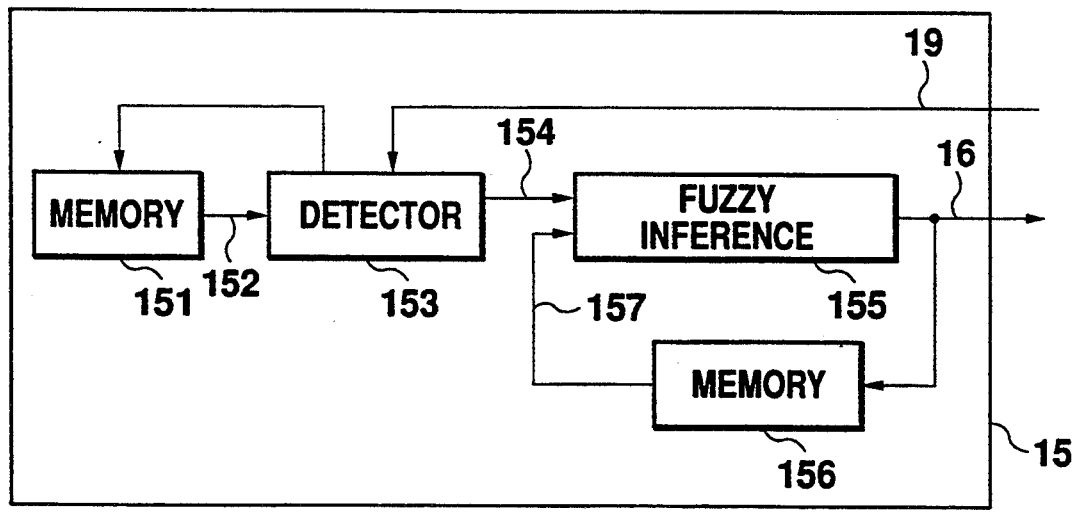
FIG. 4 is a block diagram of a coding controller according to a first embodiment of the present invention.

Before discussing the operation of the coding controller 15, it is helpful to examine the components of the controller in more detail. FIG. 4, shows the coding controller 15 in accordance with a first embodiment of the present invention. The controller 15 includes a memory 151 for storing present motion characteristics, and the past motion characteristics of the long, intermediate and short periods. The past motion characteristics of the long, intermediate and short periods will be described in more detail below. A motion characteristics detector 153 receives motion characteristic information 152 read out of the memory 151 and a present produced information amount 19 (corresponding to a code amount) per unit and detects and updates the present motion characteristics and the past motion characteristics of the long, intermediate and short periods.

Figure 7:
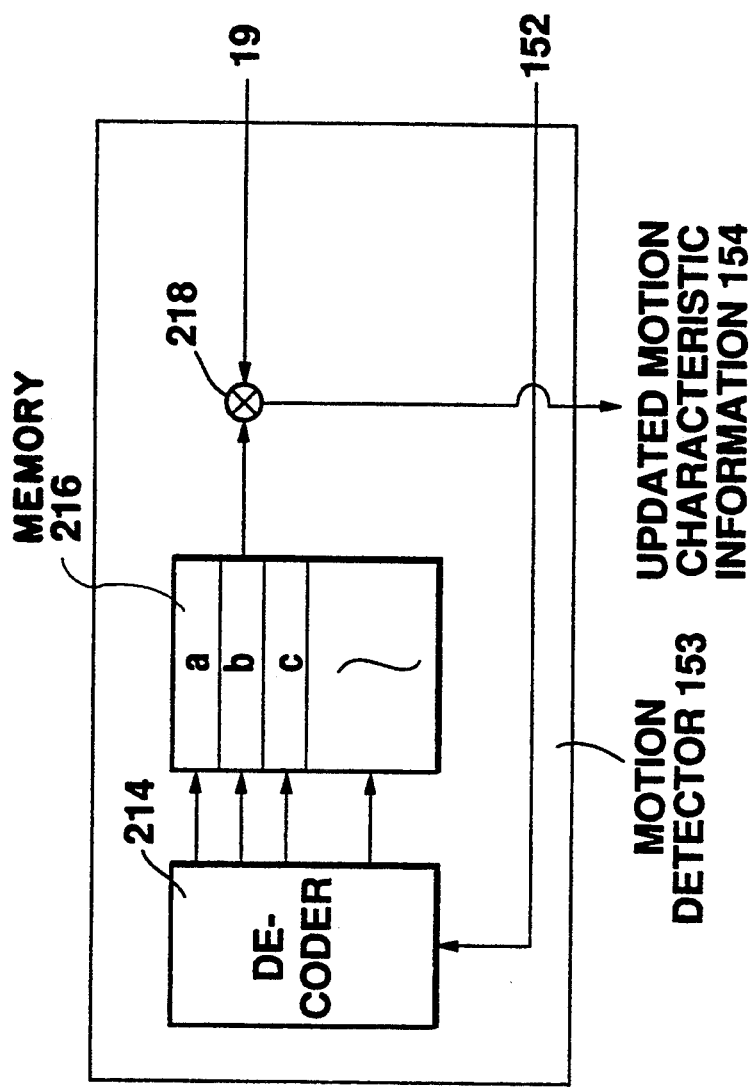
FIG. 7 is a more detailed block diagram of the motion detector 153 of FIG. 4.

FIG. 7 provides a more detailed depiction of the motion detector 153. The motion detector 153 includes a decoder 214 that decodes a quantization characteristic value that is included in the motion characteristic information sent from memory 152. The quantization characteristic value is decoded to select a conversion constant entry in a conversion constant memory 216. This memory 216 holds a number of conversion constants that are used in calculating updated motion information. Specifically, the selected conversion factor is multiplied by the present produced information amount by multiplier 218 to generate the update motion characteristic information 154o The conversion factor is necessary because the information amount alone does not indicate the extent of motion in the coded image; rather, one must know the quantization characteristic value that was employed to produce the information amount. For instance, a large quantization characteristic value will produce a smaller information amount, even if there is substantial motion in the coded image. Hence, the conversion factor provides a means for accounting for what quantization characteristic value was used.

A fuzzy inference unit 155 (FIG. 4) receives updated motion characteristic information 154 that is output from the motion characteristics detector 153 and also receives coding parameters 157 that are read out of a memory 156. The fuzzy inference unit 155 draws an inference therefrom as hereinafter described in detail to produce output inferred coding parameters 16 that represent inferred coded amounts and inferred coded object ranges. The memory 156 stores records of the inferred coding parameters 16 output by the fuzzy inference unit 155 and additionally stores the past coding parameters.

The present motion characteristics (See FIG. 9) are expressed as the difference between the present produced information amount and the target information amount. The past motion characteristics of the long period are equal to the difference between the average value of the past produced information amounts during the long period and the target information amount. The past motion characteristics of the intermediate period are equal to the difference between the average value of the past produced information amounts during the intermediate period and the target information amount. Lastly, the short period of past motion characteristics is expressed as the temporal change (time differential of change or inclination) of the past produced information amounts of the short period. The coding parameters include the present valid/invalid discrimination threshold value, the quantize characteristic value, and the temporal change (time differential of change or inclination) during the short period of past valid/invalid discrimination threshold values and the quantize characteristic values.

The coding controller 15 operates as follows. The produced information amount 19 and the long, past motion characteristics information 152 of the long, intermediate and short periods are input to the detector 153. The detector 153 updates the past motion characteristics of the long, intermediate and short periods on the basis of the newly input produced information amount and returns the updated motion characteristic information to the memory 151 wherein the updated information is stored. The detector 153 also outputs the difference between the target value at the present time and the renewed past motion characteristic information 154 of the long, intermediate and short periods to the fuzzy inference unit 155. In the fuzzy inference unit 155, the fuzzy inference of the coding parameters is carried out for every coding unit (such as a block unit, a frame unit, or the like) using the motion characteristic information 154 fed from the detector 153 and the coding parameters 157 read out of the memory 156. Further, the inferred coding parameters 16 are output to both the coder 14 and the memory 156. In the memory 156, the stored content is renewed.

The fuzzy inference operation of the coding parameter will now be described. In the fuzzy inference unit 155, an inference is carried out by applying a control rule using a membership function that expresses an indistinct outlined object as a function. An output is inferred depending on an indication of how much an input value adapts to a control rule. This indication is known as an adaptability. FIGS. 8A–8G provide an illustration of a coding control method using fuzzy inference. FIGS. 8A–8C illustrate a method for inferring an output by a rule 1 such that if $x_1$ belongs to a fuzzy set of $A_1$ (see the triangular area occupied by the membership function of $A_1$ in FIG. 8A), and $x_2$ belongs to set $AT_1$ (see FIG. 8B), then, as shown in FIG. 8C, y belongs to set $R_1$ (if $x_1=A_1$, $x_2=AT_1$, then $y=R_1$). FIGS. 8D–8F illustrate a method of inferring an output by a rule 2 such that if $x_1$ belongs to set $A_2$ (see FIG. 8D) and $x_2$ belongs to set $AT_2$ (see FIG. 8F), then, as shown in FIG. 8F, y belongs to set $R_2$ (if $x_1=A_2$, $x_2=AT_2$, then $y=R_2$). In the rules shown in FIGS. 8A–8F, the if-clauses of rule 1 and rule 2 are referred to as "antecedent parts", and the then-clauses of the rules are referred to as "consequent parts".

Each rule expresses knowledge of a conventional control method in the form of sets. For example, rule 1 shows that, if a present produced information amount ($x_1$) is moderately greater than a target value (i.e., $x_1$ lies in the set $A_1$) and a time variation of the produced information amount ($x_2$) is moderately greater than the time variation target value (i.e., $x_2$ belongs to the set $AT_1$), a difference value (y) of a quantize characteristic value is determined to be a moderate value ($R_1$). Rule 2 shows that, if the present produced information amount ($x_1$) is very much greater than the target value (in set $A_2$) and the time variation of the produced information amount ($x_2$) is very much greater than the target value (in set $AT_2$), the difference value (y) of the quantize characteristic value is determined to be a large value ($R_2$). If these rules are proper on the basis of past experiences, when information to be put between rules 1 and 2 is input, a relatively correct inference can be readily carried out by using rules 1 and 2.

That is, when a value "a" for produced information amount A, which belongs to $A_1$ (FIG. 8A) and $A_2$ (FIG. 8D) and a value "b" of AT, which belongs to $AT_1$ (FIG. 8B) and $AT_2$ (FIG. 8E) are input to the fuzzy inference unit 155, adaptability of rule 1 and rule 2 can be obtained. Relating to the adaptability of rule 1, the lower value of the adaptability of $A_1$ and "a" and the adaptability of $AT_1$ and "b" is adopted. As an inference result of rule 1, a part $R_1'$ of the adaptability, indicated by cross-hatching in FIG. 8C, of a set $R_1$ is obtained. In case of rule 2, the adaptability is obtained in the same manner as rule 1 ("a" in rule 2 is adopted), and as an inference result of rule 2, a part $R_2'$ of the adaptability, indicated by the cross-hatching in FIG. 8F, of a set $R_2$ is obtained. The last inference result of the input (a, b) is obtained by the sum set of the inference results $R_1'$ and $R_2'$ obtained in the two rules, and its center of gravity is indicated by R', which is shown in FIG. 8G. This center R' of gravity shows that the difference value of the quantize characteristic value is somewhat greater than a median. Hence, an inference is obtained such that, when the present produced information amount is slightly greater than the median so that the present produced information amount is slightly larger than the target value and the time variation of the produced information amount is fairly greater than the median, the difference value of the quantize characteristic value is increased slightly more than the median.

Figure 9:
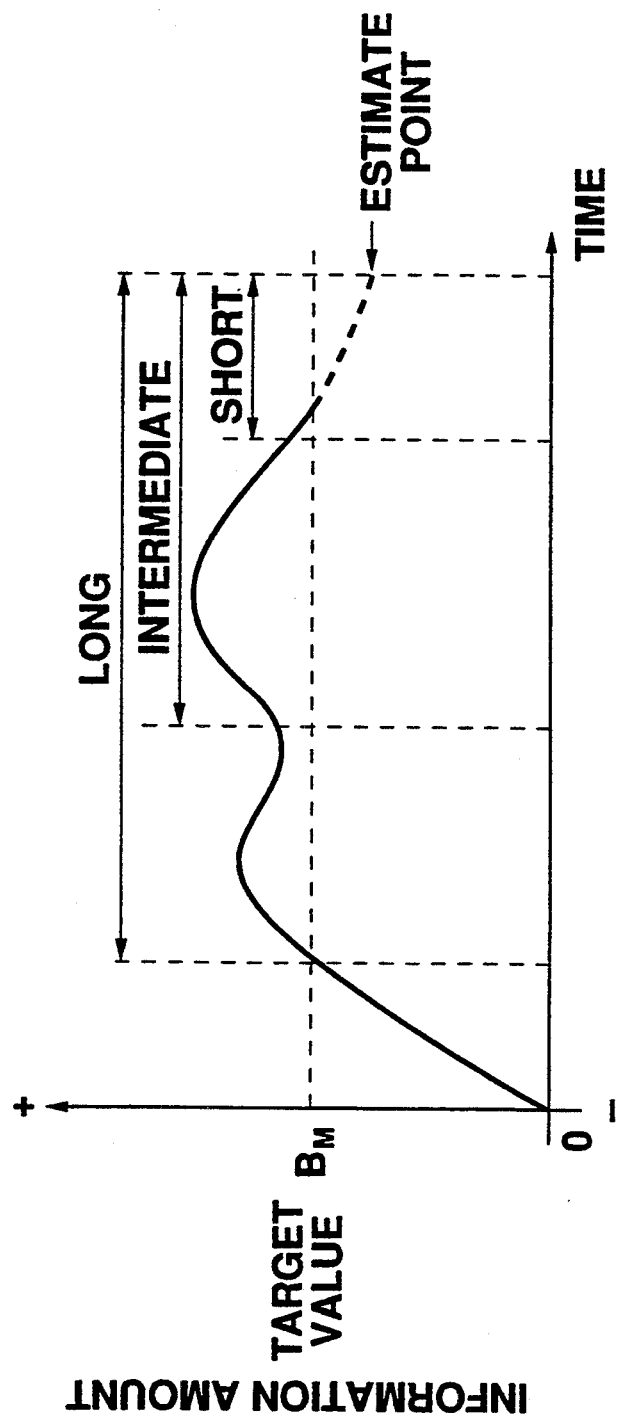
FIG. 9 is a graph showing a change in the amount of produced information for long, intermediate and short periods of motion with respect to elapsed time according to the first embodiment of the present invention.

Although the basic approach used in obtaining the fuzzy inference has been described above, in order to bring the inference result close to the optimum value, it is convenient to provide a number of control rules with detailed conditions. When the dynamic image is coded, since the produced information amount is sometimes rapidly increased by a scene change or the like, it is necessary to seize the temporal motion characteristics for the long, intermediate and short periods relative to the estimation point, as shown in FIG. 9. Further, since the image quality and the motion follow-up performance are controlled by the coding parameters, it is necessary to grasp the past records together with the motion characteristics.

Hence, the antecedent part of the control rule uses the present and past coding parameters 157 (FIG. 4), which have been read out of the memory 156, the present motion characteristics and the past motion characteristics 154 of the long, intermediate and short periods, which have been output from the detector 153.

Figures 10A, 10B, 10C, 10D, 10E, 10F, 10G, 10H:
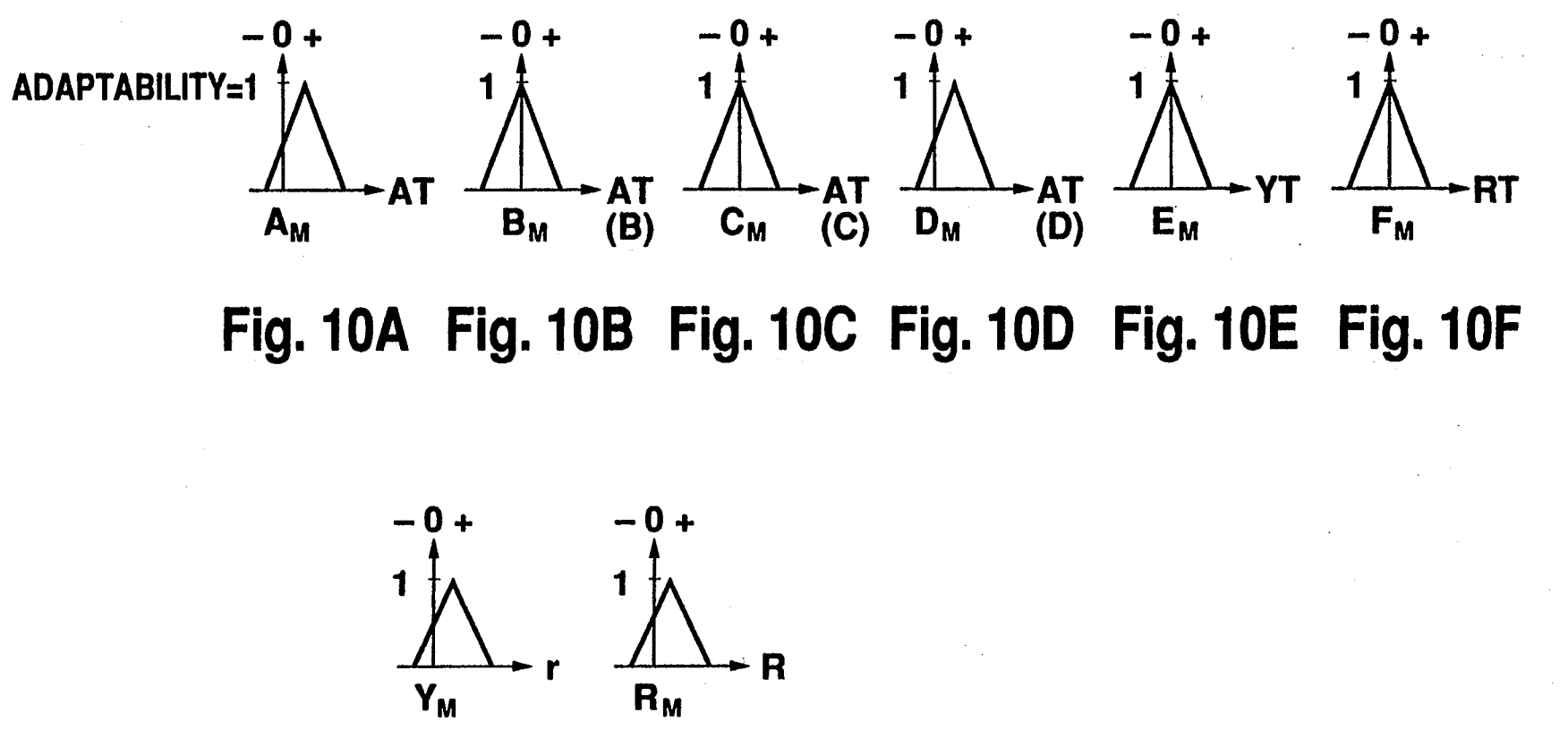

FIGS. 10A–10H illustrate a membership function of a control rule including antecedent and consequent parts. The antecedent part of the control rule include a difference A between a produced information amount and a target amount that is somewhat positive as shown in FIG. 10A. In contrast, as shown in FIG. 10B, there is almost no change of the produced information amount over the long period (see AT(B)), and, as shown in FIG. 10C, there is almost no change of the produced information amount over the intermediate period (see AT(C)). FIG. 10D illustrates that the change of the produced information amount over the short period is somewhat positive (see AT(D)). There is almost no change of a valid/invalid discrimination threshold value (see FIG. 10E), and there is almost no change RT of a difference value of a quantize characteristic value (see FIG. 10F). The consequent part of the control rule includes a valid/invalid discrimination value Y that is somewhat positive so as to moderately raise the rate of data that is deemed invalid (see FIG. 10G), and also includes a quantize characteristic value R that is somewhat positive to reduce the code amount (see FIG. 10H).

In practice, for both the antecedent and consequent parts, seven stages (such as a largely negative stage, a moderately negative stage, a slightly negative stage, an almost zero stage, a slightly positive stage, a moderately positive stage and a largely positive stage) of membership functions are prepared, and all possible combinations of control rules are made. Then, in the fuzzy inference unit 155, according to these combinations of control rules, a fuzzy inference is carried out from the present motion characteristics 154 sent from the detector 153 and the coding parameters 157 read out of the memory 156, to obtain the sum set of the inference results of all of the control rules. The center of gravity of the sum set of inference results, the valid/invalid discrimination threshold value, and the quantize characteristic value are inferred and output to the coder 14.

Figure 11:
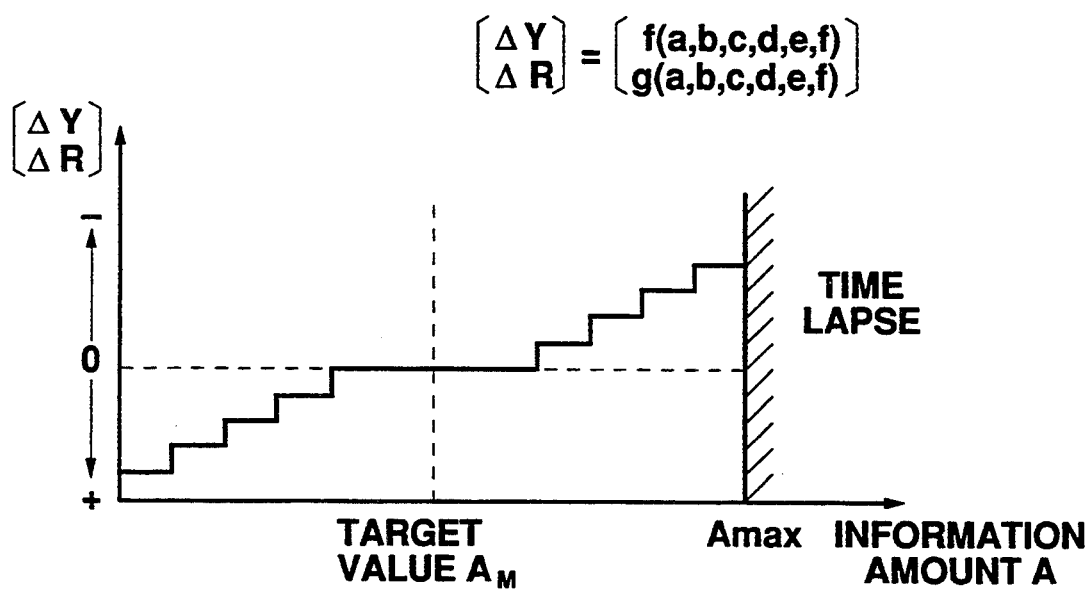
FIG. 11 is a conceptual view of the operation of the coding controller according to the first embodiment of the present invention.

In FIG. 11, there is shown a conceptual view of the operation of a coding controller in accordance with the first embodiment of the present invention. FIG. 8 provides a plot of variation amounts ΔY and ΔR of a valid/invalid discrimination threshold value Y and a quantize characteristic value R, respectively (see the vertical axis) and a produced information amount A (see horizontal axis). As shown in FIG. 11, when the produced information amount A is separated from the target value $A_m$, the variation amounts ΔY and ΔR are updated. Accordingly, the information amount that is output from the coder 14 may be close to the target value $A_M$. In FIG. 11, when the produced information amount A exceeds a certain value $A_{max}$, a time lapse control routine is performed to receive a number of frames that are transmitted per unit time in order to maintain the image quality. Further, as described above, since the valid/invalid discrimination threshold value Y and the quantize characteristic value R cannot be inferred from only the produced information amount, FIG. 11 lacks the accuracy of the formal expression of the rate but, nevertheless, helps to illustrate the concept. That is, by changing both the valid/invalid discrimination threshold value Y and the quantize characteristic value R to negative in images, the produced information amount A is made larger than the target value $A_m$. By changing both the valid/invalid discrimination threshold value Y and the quantize characteristic value R to positive, the produced information amount A is made smaller than the target value $A_m$. Of course, depending on the accuracy of control, a case where the codes of the valid/invalid discrimination threshold value Y and the quantize characteristic value R are different from each other may be properly handled.

In this embodiment, although the "min" operation which selects the smaller one of the two adaptable values, is carried out to obtain the adaptable value in the fuzzy inference unit 155 (FIG. 4), an algebraic product of the two adaptable values within the same rule (i.e., an integration $w_{1a} \times w_{1b}$ of an adaptable value $w_{1a}$ of "a" against $A_1$ and an adaptable value $w_{1b}$ of "b" against $AT_1$ in FIGS. 8A–8G) may be used. Other operation methods for carrying out a proper inference in each rule may also be used. The present invention is not intended to be restricted to the above-described inference operation methods.

In this example although the sum set of the adaptable values of the rules is calculated to obtain the center of gravity in order to determine the last adaptable value (the inference value of the coding parameter), an addition of the adaptable values of the rules is calculated to determine the center of gravity as the last adaptable value. The last adaptable value can be obtained by an operation reflecting the adaptable values of the rules. The present invention is not restricted to these methods.

In this illustrative embodiment, the antecedent part of the control rule is controlled by the six conditional sentences (such as the difference between the present produced information amount and the target value, the past motion characteristics of the long, intermediate and short periods, the valid/invalid discrimination threshold value). However, depending on the details of the control of the image quality and the motion, a reduction in the number of conditional sentences of the antecedent part, a reduction in the number of parameters that the consequent part infers, an increase of a temporal change of a threshold value of motion compensation into the conditional sentences of the antecedent part, and an addition of a difference value between present and preceding threshold values of the motion compensation into the parameters that the consequent part infers may be performed. Thus, not only the number but also the content of the conditional sentences may be varied. Since the control rules may be described according to the control accuracy, the present invention is not restricted by the number and content of the conditional sentences of the antecedent part nor is it restricted by the number and content of the coding parameters that the consequent part infers.

In this illustrative embodiment, although the coding parameters used in the antecedent part and the coding parameters used in the consequent part are the same, the number and kinds of the coding parameters used in the antecedent and consequent parts may be made different. The present invention is not restricted by the modifications. Furthermore, although the inference of the coding parameter per block unit is carried out in this illustrative embodiment, the inference can be executed per pixel unit, or per block group unit. Still further, the present invention is not restricted to a particular type of processing unit. In the system described above, the above-described processes can be implemented in hardware or software, and the present invention is not restricted by any manner of composition.

Figure 12:
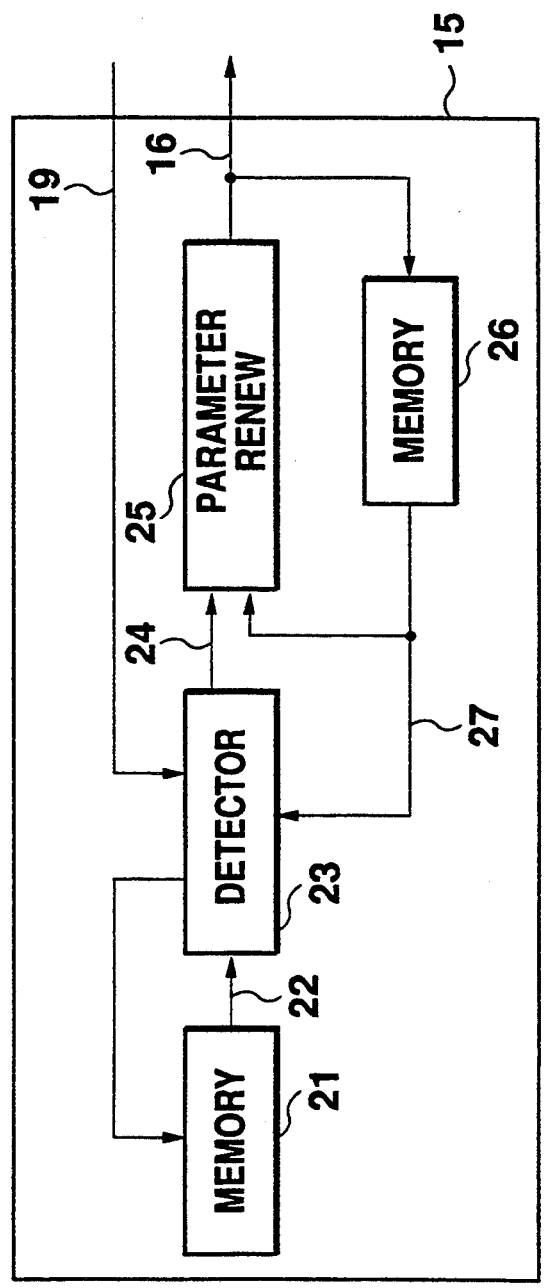
FIG. 12 is a block diagram of a coding controller according to a second embodiment of the present invention.

FIG. 12 shows a coding controller 15 according to a second embodiment of the present invention. In this second embodiment, a memory 21 stores present and past motion characteristics, and a motion characteristics detector 23 receives various motion characteristic information 22 that has been read out of the memory 21. The characteristics detector 23 also receives the present produced information amount 19 for each unit that is processed and updates the present and past motion characteristics. A coding parameter renew unit 25 receives various renewed motion characteristic information 24 output from the motion characteristics detector 23 and various coding parameters 27 read out of a memory 26. The coding parameter renew unit 25 updates the coding parameters to output updated coding parameters 16. The memory 26 stores records of the updated coding parameters 16 output by the coding parameters renew unit 25 and the past coding parameters. The coding parameters 27 read out of the memory 26 are sent to the detector 23. The same coding processor that is used in the first embodiment of FIG. 4 may be employed in the second embodiment of the present invention.

As shown in FIG. 12, the produced information amount 19, the past motion characteristics 22 that has been read out of the memory 21 and the various coding parameters 27 that have been read out of the memory 26 are input to the detector 23. The detector 23 updates the past motion characteristics according to the produced information amount 19 and feeds back the updated motion characteristics to the memory 21. Further, the detector 23 obtains a conversion information amount H as the motion characteristics from a quantize characteristic value Q and also obtains the produced information 19 of the coding parameter 27 from the memory 26 according to the curves shown in FIG. 14. The detector 23 outputs the present and past motion characteristics 24 to the coding parameter renew unit 25. In the coding parameter renew unit 25, $\Delta Q$ is obtained from the motion characteristics 24 (the conversion produced information amount H), and $\Delta Q$ is added to the quantize characteristic value Q of the coding parameter 27 to update the value Q. The updated coding parameter 16 is sent to the memory 26 and the coder 14 of the coding processor shown in FIG. 4.

Figure 14:
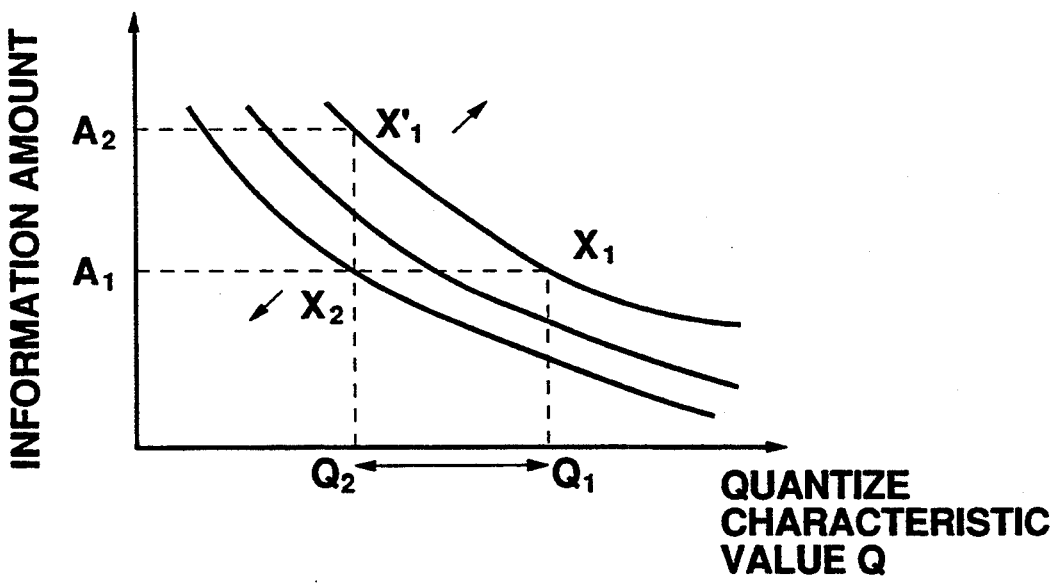
FIG. 14 is a graph of the relationship between a quantize characteristic value and a produced information amount according to the second embodiment of the present invention.

FIG. 14 shows the relationship between the quantize characteristic value Q and the produced information amount at a certain standard temporal resolution (i.e., frame rate). As shown in FIG. 14, the lower curve represents the characteristics for coding the input images with less motion, and the upper curve represents the characteristics for coding the input images with more motion. The greater the motion of the input images, the larger is the produced information amount. Hence, for a given produced information amount $A_1$, as the motion of the input image becomes large, the quantize characteristic value Q becomes large. The quantize characteristic value Q and the temporal resolution (the frame rate) are selected to obtain a produced information amount H. Hence, the degree of motion of the image may be accommodated by examining the conversion produced information amount.

The conversion produced information amount H is obtained as follows. In FIG. 14, for example, by using the standard characteristic curve designated $X_1$, when the actual quantize characteristic value is $Q_2$ and the produced information amount is $A_1$, the point $X_1'$ corresponding to the value $Q_2$ is located on the curve, and the produced information amount $A_2$ corresponding to the point $X_1'$ becomes the conversion produced information amount H. Such a conversion can be achieved by preparing maps that are provided with conversion factors for the standard characteristics, corresponding to A and Q values.

Figure 13:
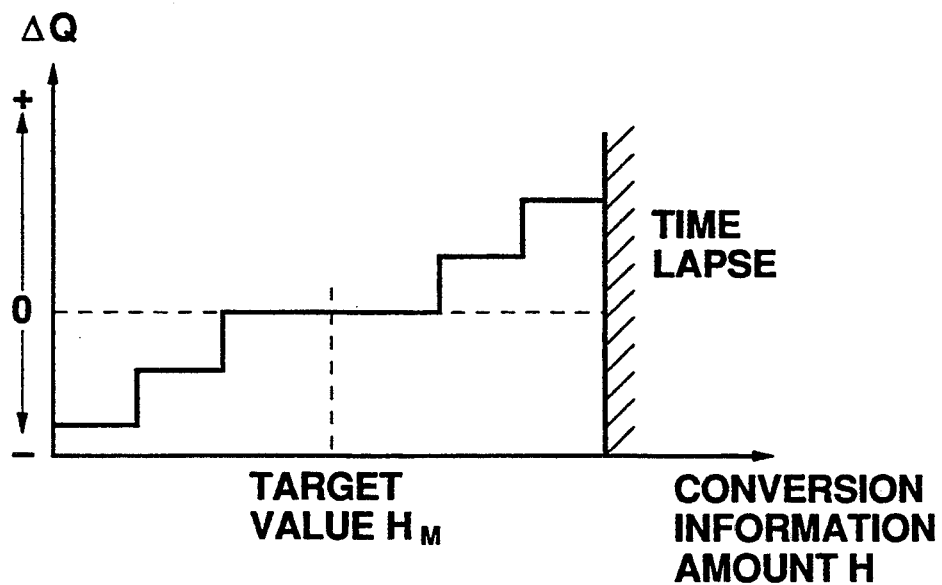
FIG. 13 is a schematic view showing one example of a quantize characteristic value control mode by the coding controller according to the second embodiment of the present invention.

FIG. 13 illustrates a control example for renewing the quantize characteristics value Q depending on the motion amount or the conversion produced information amount H. When the conversion produced information amount is larger than the target value $H_m$, the motion amount is considered to be large, and the present quantize characteristic value Q is enlarged (as shown by the increasing plot in FIG. 13) compared to the preceding value $Q_{-1}$ in order to reduce the produced information amount. In turn, when the conversion produced information amount is smaller than the target value $H_m$, the motion amount is considered to be small, and the present quantize characteristic value Q is diminished (as shown by the decreasing plot in FIG. 13) relative to the preceding value $Q_{-1}$ in order to increase the produced information amount. Accordingly, the control is carried out as described above so that the spatial resolution (coded image quality) may be close to the predetermined (uniform) value. When the conversion produced information amount H is more than a certain value or comes within a hatched area, a time lapse control method is performed (i.e., a number of frames to be transmitted per unit time is reduced) in order to maintain the image quality above a certain level.

In this embodiment, although the renew value of the quantize characteristic value is determined from one conversion produced information amount H, the renew value of the quantize characteristic value may be decided from a plurality of conversion produced information amounts, such as the present and past conversion produced information amounts. Further, although the control of the coding parameter is described as being carried out per block unit, it may be performed per pixel unit, or per block group unit including a plurality of blocks. Also, depending on the input image, the coding parameter control may be conducted only against a local block, or against selected frames or the like, to perform the renewal of the parameter.

Still further, although a quantize characteristic value is used in the illustrative second embodiment, as the coding parameter relating to the spatial resolution, other coding parameters of the spatial resolution may be used, and a combination of such parameters may also be used.

Figure 15:
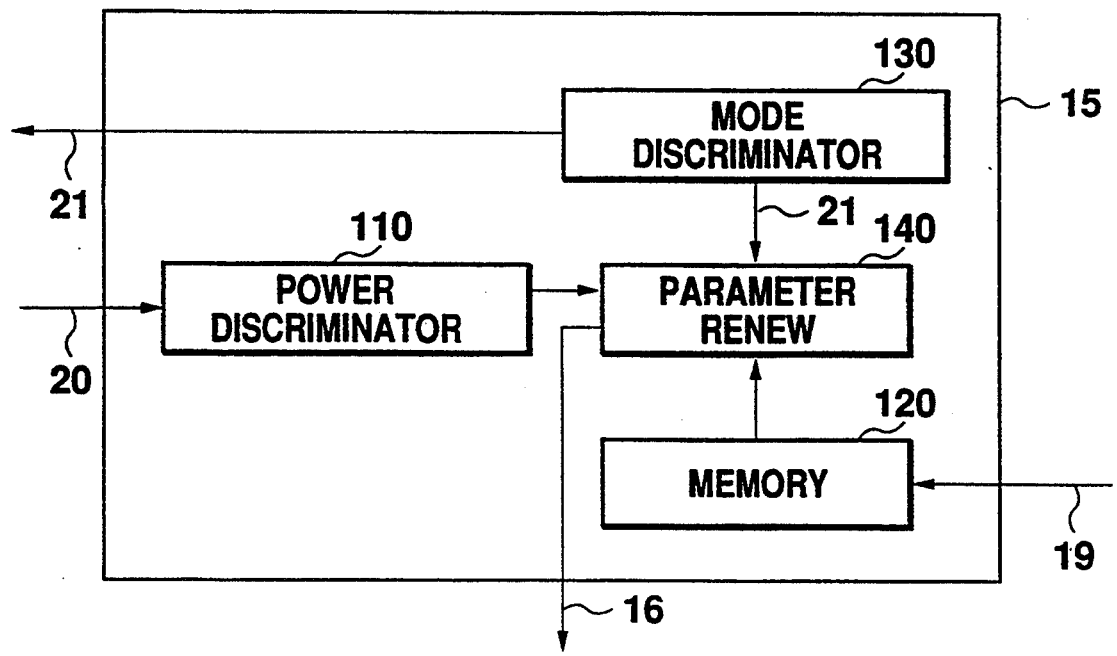
FIG. 15 is a block diagram of a coding controller according to a third embodiment of the present invention.

FIG. 15 shows a coding controller 15 according to a third embodiment of the present invention. As shown in FIG. 15, an estimated error power discriminator 110 receives the estimated error power 20 of an input image and an estimated image and discriminates the intensity or size of the estimated error power. A memory 120 stores the produced information amount 19. A coding mode discriminator 130 discriminates coding modes to output the coding mode 21. A coding parameter renew unit 140 determines a produced information amount target value $B_m$ using the discriminated intensity or size of the estimated error power that has been sent from the estimated error power discriminator 110. In determining $B_m$, the renew unit 140 also uses the produced information amount that has been read out of the memory 120, the coding mode that has been sent from the coding mode discriminator 130 and a period T that has been determined internally. The renew unit then outputs the coding parameter 16 that captures $B_m$.

Figure 16:
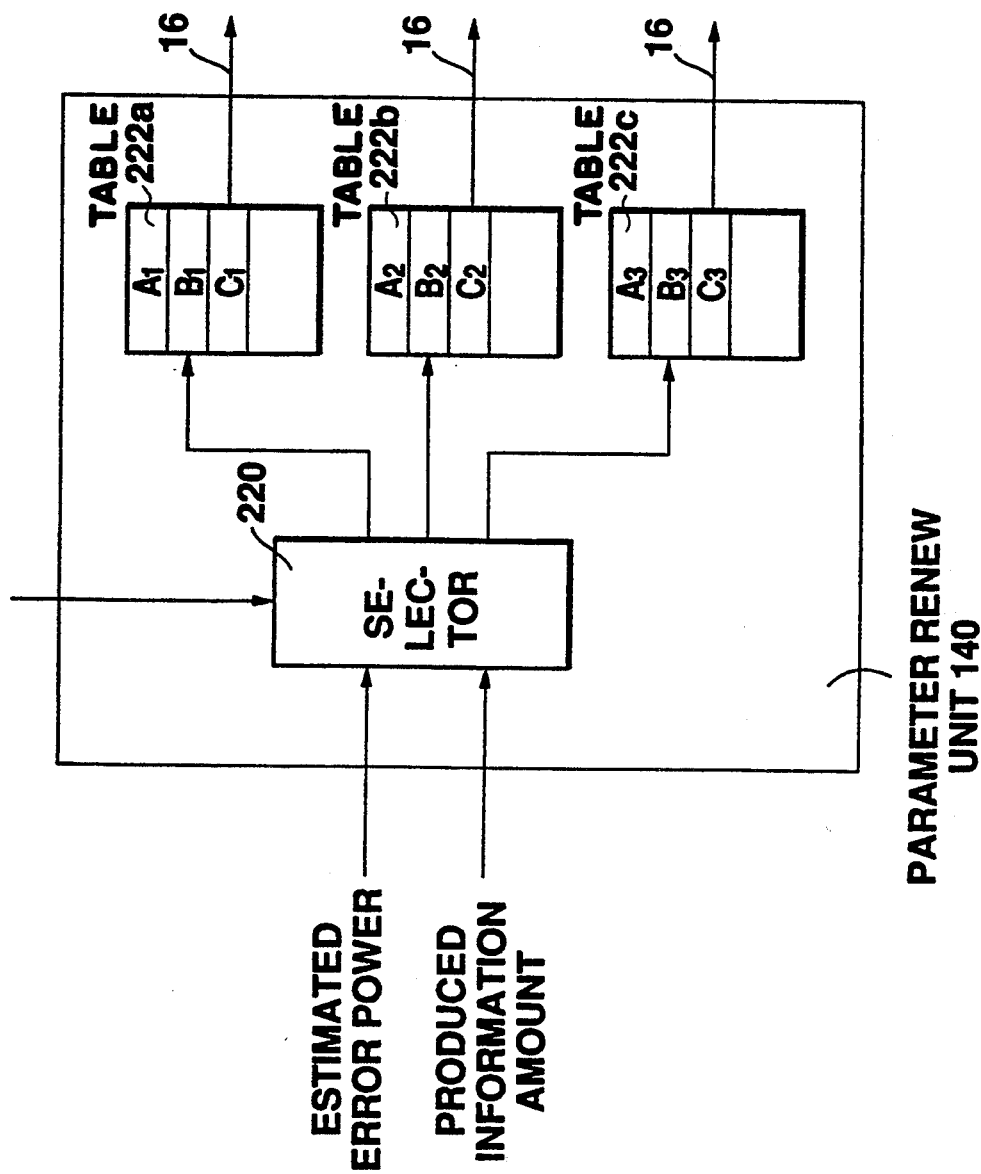
FIG. 16 is a more detailed block diagram of the parameter renew unit 140 of FIG. 15.

FIG. 16 provides a more detailed view of the parameter renew unit 140. The parameter renew unit 140 includes a selector 220 for selecting among parameter tables such as 222a, 222b and 222c. The selector 220 uses the inputs of the encoding mode, the estimated error power and the produced information amount to select a table and entry in the table. The selected entry is then output as the coding parameter 16.

Figure 17:
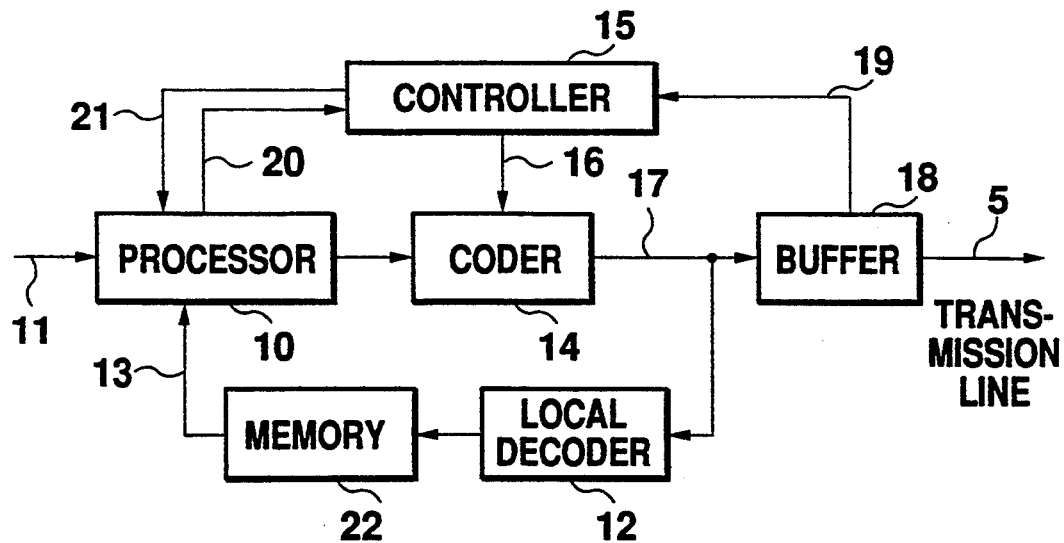
FIG. 17 is a block diagram of a coding processor in a sending side according to the third embodiment of the present invention.

FIG. 17 shows a coding processor in a sending side in accordance with the third embodiment of the present invention. In this third embodiment, an image processor 10 receives the input image data 11 and the decoded data 13 output from a sending side local decoder 12 through a local decode image memory 22 and processes the received data. Depending on the coding mode 21 that is output from the coding controller 15, the processor 10 processes the input and either outputs a difference value between the input image data 11 and the decoded data 13 or outputs the input image data 11. The image processor 10 also outputs the estimated error power 20 to the coding controller 15. The local decoder 12 locally decodes coded data 17 sent from a coder 14 in the sending side and outputs the locally decoded data 13. The coder 14 codes the data output from the image processor 10 in accordance with the coding parameters 16 sent from the coding controller 15, which has been described above, to output the coded data 17. A transmission buffer 18 temporarily stores the coded data 17 sent from the coder 14. The buffer 18 outputs the produced information amount 19 to the coding controller 15 and also outputs the coded data 17 to a transmission line 5. The memory 22 stores the image data of the locally decoded frames.

Figure 18:
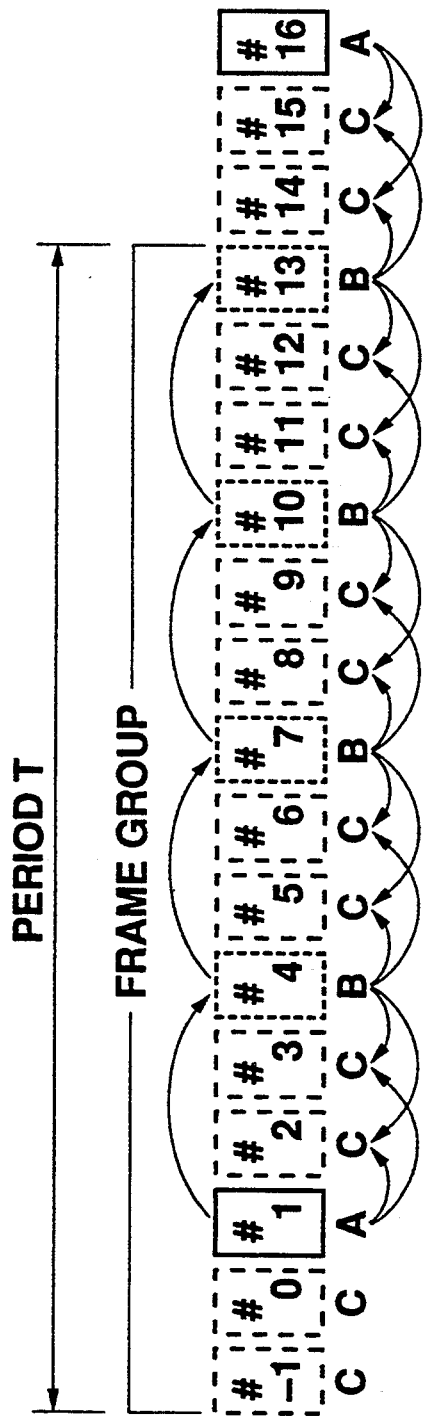
FIG. 18 is a schematic view showing a period of frames to be coded by different coding modes according to the third embodiment of the present invention.

The operation of the system described above in connection with FIGS. 15 and 17 will now be described in detail. First, the operation of a sending side coding unit is described. FIG. 18 schematically shows a period T of frames to be coded by different coding modes. These are, mode A: a frame is coded by using only data within the current frame; mode B: a frame is estimated in one temporal direction; and mode C: a frame is estimated to both temporal directions. In the image processor 10, in accordance with the coding mode 21 output from the coding controller 15 to the coder 14, the block (including 8×8 pixels of the input image 11) is output in an intra-frame estimation mode denoted as mode A. On the other hand, difference data indicating the difference between the block of the input image 11 and the block of the estimated image 13 (the frame A or B shown in FIG. 18) that is output from the memory 22 is output when the coding moding an inter-frame one direction estimation mode denoted as mode B. Lastly, difference data indicating the difference between the block of the preceding or following frame with reference to the present frame to be coded are output when the coding mode is in an inter-frame dual direction estimation mode denotes as mode C. For example, in FIG. 18, when the frame #2 is coded in mode C, the difference data between an arithmetic mean of frames #1 and #4 and the input frame #2 is output to the coder 14.

In the coder 14, in accordance with the coding parameter 16 sent from the coding controller 15, the image block data input from the image processor 10 are coded to output the coded data 17 to not only the transmission line 5 via the transmission buffer 18 but also to output the coded data to the sending side local decoder 12. In the sending side local decoder 12, the coded data 17 are locally decoded, and the decoded data 13 are sent to the local decoded image memory 22 for storage therein. In the transmission buffer 18, the information amount 19 produced per unit that is processed (block unit in this embodiment) is output to the coding controller 15.

Figure 19:
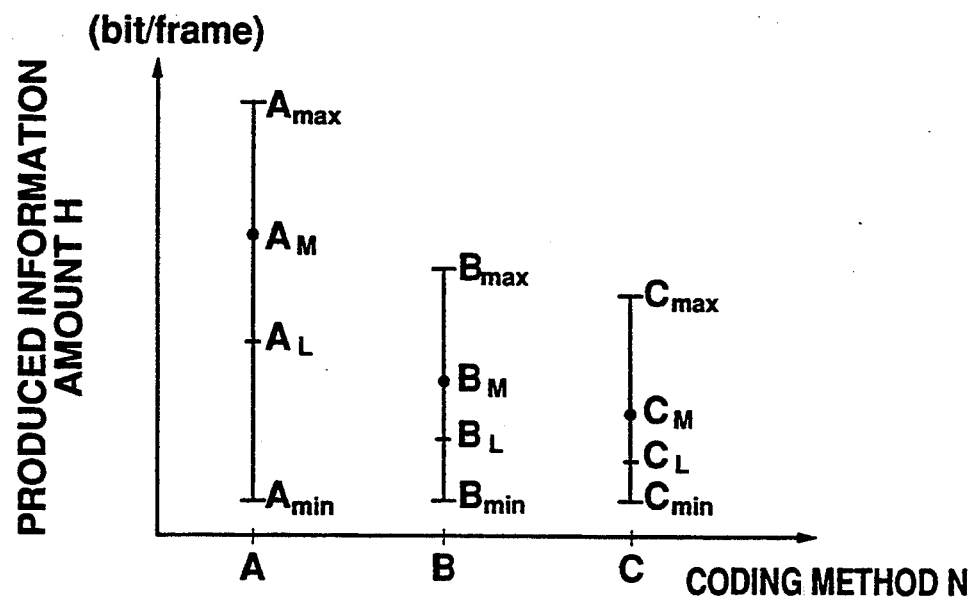
FIG. 19 is a graphical representation showing the relationship between a produced information amount target value and a coding mode according to the third embodiment of the present invention.
Figure 20:
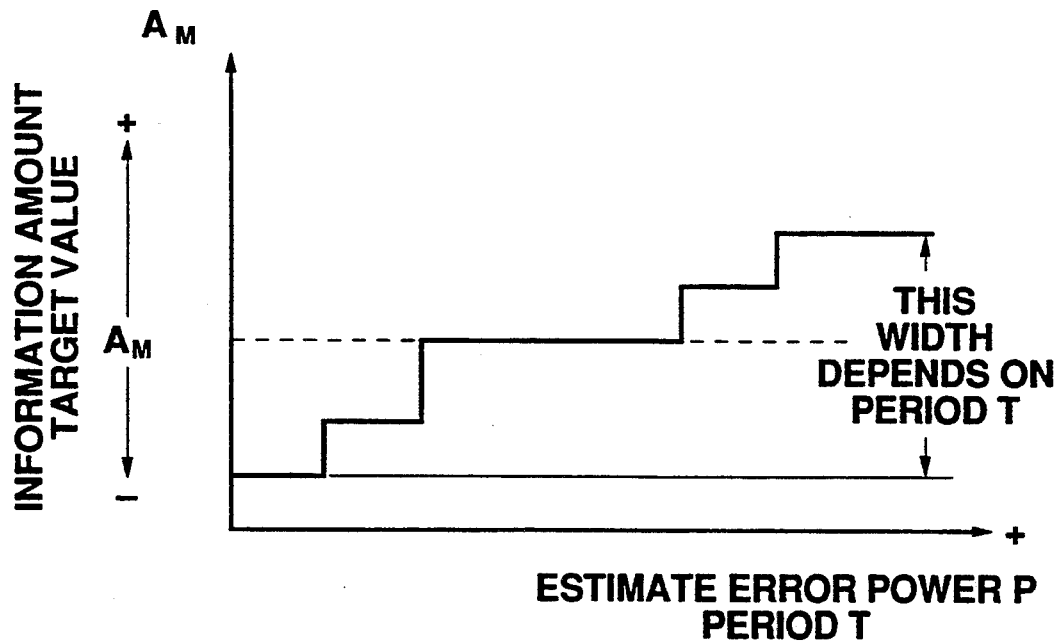
FIG. 20 is a graphical representation showing the relationship between the produced information amount target value and an estimated error power and period according to the third embodiment of the present invention.

The operation of the coding controller 15 shown in FIG. 15 will now be described. The produced information amount 19 output from the transmission buffer 18 is sent to the memory 120 and is stored therein. On the other hand, the image processor 10 calculates the estimated error power P 20 of the data output depending on the chosen mode. The image processor 10 sends the estimated error power P 20 to the estimated error power discriminator 110. The estimated error power P is the value representing the total size of the output data. The estimated error power P is the sum of the absolute value of the data of each pixel. Hence, in mode B or C, the estimated error power P becomes the sum of the absolute value of the difference data. In the estimated error power discriminator 110, the size of the estimated error power P (the differential absolute value sum) 20 is discriminated, and the result is output to the coding parameter renew unit 140. In the coding mode discriminator 130, depending on the number of the frame to be coded, the coding mode 21 is selected and output to both the image processor 10 and the coding parameter renew unit 140. In the coding parameter renew unit 140, as shown in FIG. 19, a base $A_m$ of the produced information amount target value that corresponds to the coding mode N is determined. As shown in FIG. 20, when it is found, from the discrimination result of the estimated error power discriminator 110, that the estimated error power 20 is large, a positive offset is added to the base $A_m$. The degree of largeness of the estimated power determines the extent of positive offset. In turn, when the estimated error power 20 is small, a negative offset is added to the base $A_m$. The degree of smallness of the estimated power determines the extent of negative offset. As a result, the produced information amount target value $A_m$ (hereinafter referred to as $A_m$ in short), to be used for estimating the coding parameter, is renewed. In this embodiment, the optimum determination of the target value for each frame can be carried out for an estimated error power P.

FIG. 19 shows relationship between the coding method and the produced information mount H. In FIG. 19, $A_{max}$ refers to a maximum value, $A_M$ refers to a target value, $A_L$ refers to a lower limit, and $A_{min}$ refers to a minimum value of the produced information mount in mode A. The coding method N may also operate in modes B and C. The subscripts used for produced information amounts in these modes correspond to the subscripts used for mode A.

In mode A, the produced information amount varies from $A_{min}$ to $A_{max}$. Analogously, in modes B and C, the produced information mounts varies from $B_{min}$ to $B_{max}$ and $C_{min}$ to $C_{max}$, respectively. Therefore, it is impossible to know the mode in which the coding process is being executed in when the produced information mount is smaller than $C_{max}$. For example, when operating in mode A on a monocolor image, the DCT conversion and quantization produces only DC components or low level AC components. As such, only a small amount of information is produced. In modes B and C, when two frames have few images containing different pixels and the images undergo DCT conversion and quantization, only DC components or low level AC components are generated. In such instances, a small amount of produced information will be obtained.

The coding parameters are renewed depending upon the produced information amount regardless of the mode of operation, and thus, the quality of the decoded image depends upon the mode of operation. Specifically, if the produced information amount and the quantize characteristic value are the same for modes A, B and C, the quality for precision of the decoded image for mode A will typically be inferior To the quality of the decoded images for modes B and C. Therefore, the decoded image produced in modes B or C will not necessarily satisfy the target quality for precision. This failure in quality stems primarily from the decoded image obtained in mode A serving as a reference that is below the target quality. As such, more data concerning the difference between images is produced unnecessarily.

The target values of the produced information amounts are independently determined for modes A, B and C so as to obtain a stable image quality. The produced information amounts are independently determined because information amounts tend to vary with coding mode. When the produced information amount does not meet the target value, the coding parameter is renewed. For example, if the produced information amount in a previous mode (i.e., mode A) is larger than $A_M$ in mode A, the quantize characteristic value Q is made larger than "1" (supposing that the previous value of Q was "3" and the present value of Q is "4"). Otherwise, if the produced information amount in mode A is smaller than $A_L$ in mode A, the quantize characteristic value Q is made smaller than the previous value Q.

If the previous produced information amount is too old, the present frame will be temporarily coded by a preset quantize characteristic value. The data that is coded using this preset quantized characteristic value will be used without any modification according to the produced information amount at that moment. Otherwise, the coding will be carried out again by renewing the value of Q. In addition, it is possible to renew the coding parameter according to the previous produced information amount and the produced information amount that is temporarily used to code the present frame.

In the above described example, the coding parameter is described as the quantize characteristic value, but it should be appreciated that the coding parameter may be a motion compensating on/off threshold value, or a valid/invalid discrimination value. The scope of this invention is not intended to be limited by the kind of coding parameters that are employed. In addition, the scope of this invention is not intended to be limited according to the kinds of produced information amount data.

In FIG. 19, $A_m(N)$ is different in modes A, B and C because reproducing the same extent of image quality produces much more information in the intra-frame estimation mode (mode A) compared with the value of $A_m(N)$ in the inter-frame estimation mode (mode B or mode C). In order to keep the necessary image quality, much more information must be produced in mode A or mode B, where the coded frame is used for the next estimation in contrast with the mode C where the coded frame is not used for the next estimation. The renewed coding parameter Q is stored in the coding parameter renew part 140.

Figure 21:
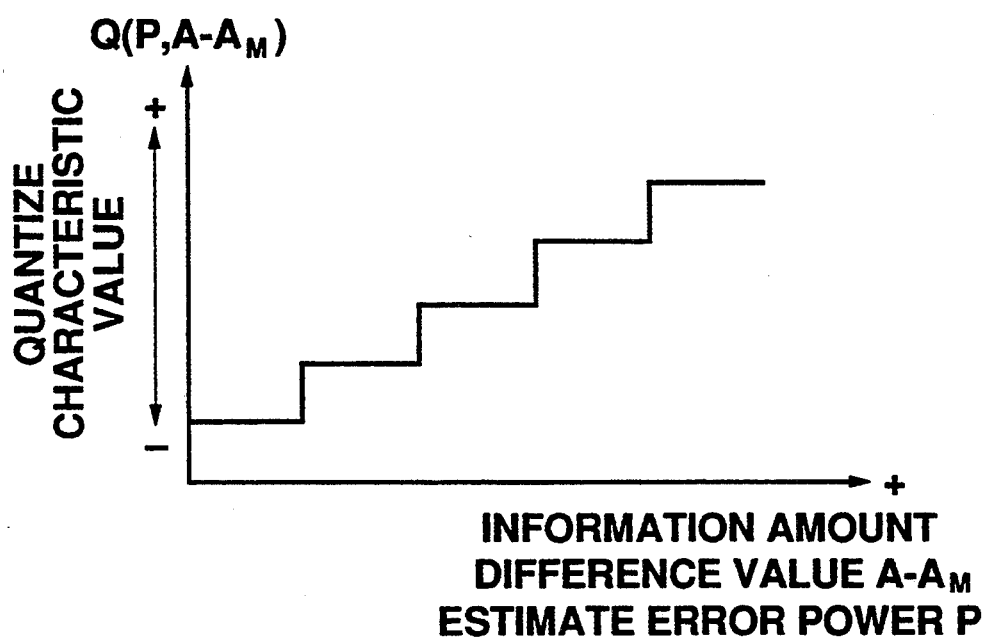
FIG. 21 is a graphical representation showing the relationship between the quantize characteristic value and the produced information amount target value and the estimated error power according to the third embodiment of the present invention.

The relationship between the quantize characteristic value Q and the estimated error power P or the produced information amount difference value $A-A_m$ (i.e., the difference between the produced information amount A output from the memory 120 and the produced information amount target value $A_m$) is shown in FIG. 210 The larger the estimated error power P, the more the quantize characteristic value Q is raised as shown in FIG. 21. Further, the larger the produced information amount difference value $A-A_m$, the more the quantize characteristic value is increased as shown in FIG. 21. As a result, the change of the produced information amount can be controlled so as to make the produced information amount close to the target value.

In this embodiment, although the coding process is carried out per block unit and the coding control is executed per frame unit, the coding process may be performed per pixel unit or per block group unit that includes a plurality of blocks. In addition, the coding control can be carried out per block unit or per block group unit.

As shown in FIG. 21, although the quantize characteristic value is obtained, the basic quantize characteristic value Q may be determined from the total produced information amount $A_{mt}$ of the period T, and then the offset of the quantize characteristic value Q may be obtained, depending on the produced information amount difference value $A-A_m$ and the estimated error power P to renew the quantize characteristic value Q. Also, the offset can be added to the quantize characteristic value Q used in the preceding process unit to renew the quantize characteristic value Q.

In this embodiment, the valid/invalid block discrimination threshold value (to be used for discrimination whether the block is valid or invalid) may be used as the coding parameter. The present invention is not restricted by the type or number of the coding parameters. In addition, intra-frame estimation of the block may be executed to carry out the coding. Although the both direction estimate is performed in every block within the frames in the mode C, the intra-frame estimation or the inter-frame one direction estimation of the block may be used to carry out the coding. Further, the coding modes are not restricted to the three modes A, B and C. Other coding modes may be used, and the present invention is not restricted by the type or number of the coding modes.

In this embodiment, although the difference absolute value sum is used as the estimated error power 20, a difference square sum may also be used, and the present invention is not restricted by the type of the estimated error power. Moreover, as shown in FIG. 18, although one period T includes 15 frames, the number of the frames included in one period T may be varied, and the coding modes present within the period may be replaced with other coding modes. The present invention is not restricted by the length of the period, the number of frames in one period or the number of coding modes within the period. Lastly, although the produced information amount 19 output from the transmission buffer 18 is stored in the memory 120 in the illustrated embodiment, the produced information amounts in one period may be further stored simultaneously in the memory 120, and the processed value, such as a total sum value of the produced information amounts in every unit process along with the produced information amounts in every unit process, may be stored.

Figure 22:
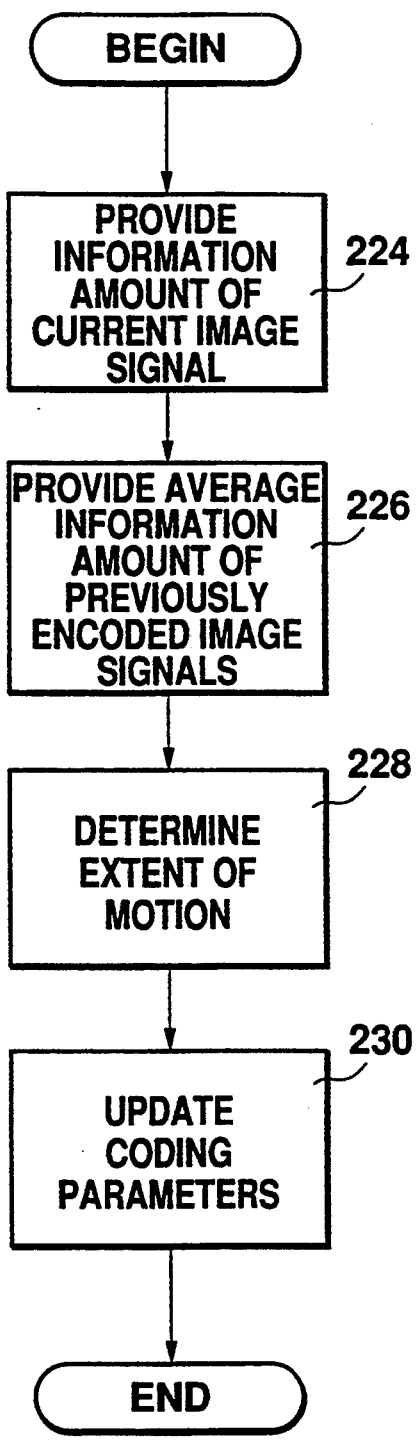
FIG. 22 is a flowchart of a method in accordance with the present invention.

The operation of the above-described embodiments may be summarized as follows. The coder for coding a sequence of image signals is controlled by coding parameters that are sent to the coder. These coding parameters are updated in accordance with the steps shown in the flowchart of FIG. 22. Specifically, the system provides an information amount of a current image signal and an average information amount for at least one previously encoded image signal (steps 224 and 226). The system then determines the extent of motion between the current information signal and the previously encoded signal based on the information amount and average information amount that has been provided (step 228). The coding parameters are then updated based on the determined extent of motion and current coding parameters (step 230).

Although the present invention has been described in its preferred embodiments with reference to the accompanying drawings, it is readily understood that the present invention is not restricted to the preferred embodiments and that various changes and modifications can be made by those skilled in the art without departing from the spirit and scope of the present invention.

What is claimed is:

1. In an image coding system having a coder for coding a sequence of image signals, as dictated by a control signal that sets coding parameters for the coder, a controller for controlling the coder, comprising:
   a) a power calculator for calculating an estimated output power as a sum of a size of a data that is output by an image processor; and
   b) a coding update means for generating the control signal based on current coding parameters and the estimated output power.

2. A controller as recited in claim 1 wherein the coding update means comprises a coding parameter sets means that generates the control signal so that the coding produces a target information amount.

3. In an image coding system having a coder for coding a sequence of image signals, as dictated by coding parameters for the coder, a method of updating the coding parameters, comprising the steps of:
   a) providing a size of the data that is output by an image processor;
   b) calculating an estimated output power as a sum of the size of the data that is output by the image processor; and
   c) updating the coding parameters based on the estimated output power and current coding parameters.

4. An image coding process apparatus for coding input image data that is temporally changing, comprising:
   a coder for coding the input image data under a predetermined quantize condition in a plurality of different coding modes, each mode coding the data in a different fashion;
   an image processor for receiving the input image data and processing the input image data to supply data to the coder that is compatible with the coder;

a power calculator for calculating estimated output power as a sum of a size of the data that is output by the image processor; and coding parameter set means for setting a target produced information amount in the coder according to a result from the power calculator and for setting the quantize condition in coding according to the target produced information amount.

5. The apparatus of claim 4, wherein the coder changes the coding modes according to a predetermined sequence at a predetermined period.

6. The apparatus of claim 4, wherein according to the period, the quantize condition in the coder is changed.

7. The apparatus of claim 6, wherein the quantize condition includes a quantize characteristic value representing a size of each quantization step.

8. The apparatus of claim 7, wherein the coding modes include a first mode for simply coding an input image of a first frame, a second mode for coding a difference between an image of a second frame and the input image of the first frame, and a third mode for coding a difference between input images of preceding and following frames of the first frame.

9. The apparatus of claim 8, further comprising:

decoder means for decoding the coded data output by the coder; and memory means for storing image data decoded by the decoder means, wherein in the second mode, a difference between the decoded image data obtained by the decoder means and the input image data is obtained by the image processor.

10. The apparatus of claim 9, further comprising a second coding method for coding the input image data according to a plurality of coding systems.

11. The apparatus of claim 9, wherein the coding methods are alternately selected at a predetermined cycle.

* * * * *